Sept. 25, 1923.
F. V. ANDERSON
TIRE TOOL
Original Filed April 30, 1921
1,469,138
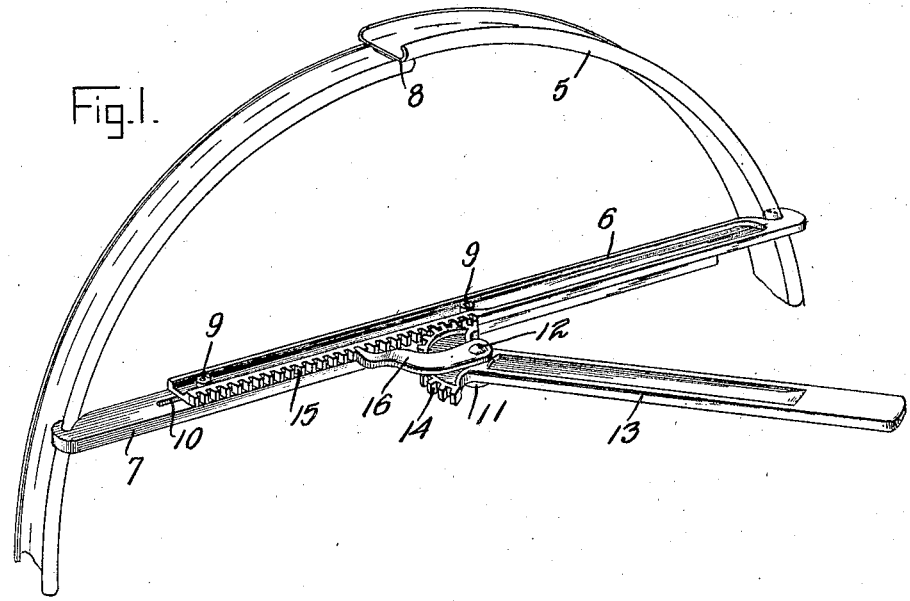
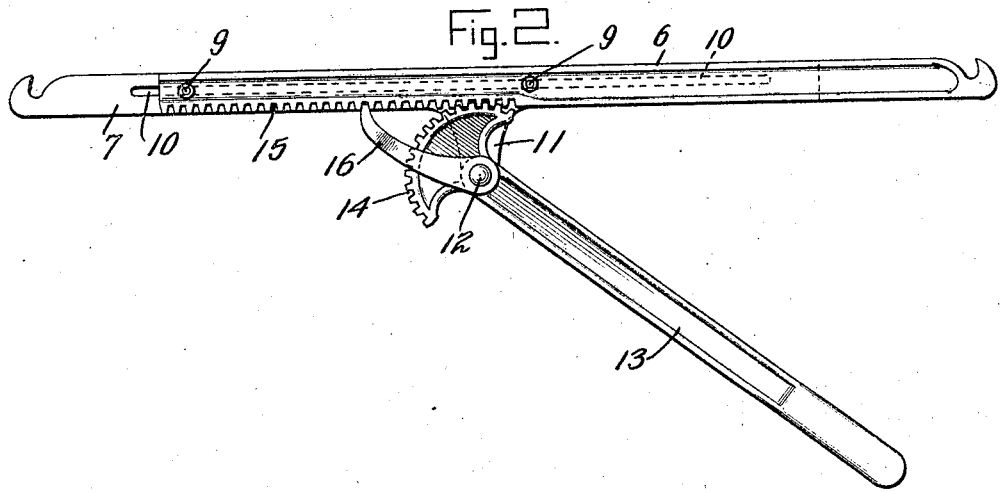
Inventor
Francis V. Anderson

UNITED STATES PATENT OFFICE.

FRANCIS V. ANDERSON, OF RACINE, WISCONSIN.

TIRE TOOL.

Application filed April 30, 1921, Serial No. 465,798. Renewed August 13, 1923.

*To all whom it may concern:*

Be it known that I, FRANCIS V. ANDERSON, a citizen of the United States, residing at Racine, in the county of Racine and State of Wisconsin, have invented certain new and useful Improvements in Tire Tools, of which the following is a specification.

My said invention relates to an implement for removing demountable rims from automobile tires.

It is an object of my invention to provide a device which shall be simple and effective and which may also be used in mounting a tire on a demountable rim.

Referring to the accompanying drawings which are made a part hereof and on which similar reference characters indicate similar parts, Figure 1 is a perspective of my device in operation, and Figure 2, a side view of the implement.

In the drawings reference character 5 indicates a demountable rim of any ordinary construction, the rim being shown in contracted position.

The implement comprising two relatively slidable bars 6 and 7 has a jaw at the extreme end of each bar to engage a flange of the rim and is intended as here shown to be engaged with the rim adjacent the break in the rim here indicated by reference numeral 8. The two bars are held together by bolts 9 passing through holes in one bar and slidable in a slot of the other. I have shown a preferred form of connecting means but it will be obvious that other means may be used without departing from my invention. For moving the bars 6 and 7 relatively to one another I have provided an extension 11 on bar 7, this extension having a pivot 12 fast thereon or journaled in a bearing on the extension. A hand lever 13 is mounted on the pivot and has at its inner end a segment rack 14 engaging rack teeth 15 on bar 6. A locking pawl 16 is also mounted on the pivot and is adapted to engage rack teeth 15 to hold the parts against movement.

In operation the jaws are extended preferably to their full extent and engage over the flanges of the rim as shown in Figure 1. The pawl 16 is then raised and the lever 13 moved to the right thereby sliding the bars 6 and 7 on each other in a direction to contract the rim. When the rim has been sufficiently contracted pawl 16 is engaged with teeth 15 and prevents the spring action of the rim from moving the bars to reverse the above action. The operation of the device whereby a tire may be placed on a rim will be obvious, it being only necessary to place the implement on a rim and contract the same as shown after which the tire may be placed on the rim and the implement released therefrom to permit the rim to spring out into engagement with the tire.

While I have shown a preferred form of the invention I do not limit myself to what is shown in the drawings and described in the specification as modifications of the same within the scope of my invention will occur to those skilled in the art. It may be used to expand a rim to fit a tire when necessary for any reason, as well as to contract the rim, as described.

Having thus fully described my said invention, what I claim as new and desire to secure by Letters Patent, is:

An implement for contracting demountable rims consisting of a pair of bars having face contact with each other and having jaws for engaging the edge of such a rim, pin and slot connections fastening them slidably together, a lever pivoted on one bar and lying in the plane of the other said lever being formed at its end as a segment rack, teeth on the other bar engaged by said rack, and a pawl on the pivot of the lever also engaging said teeth, substantially as set forth.

In witness whereof, I have hereunto set my hand and seal at Racine, Wisconsin, this twenty-sixth day of April, A. D. nineteen hundred and twenty-one.

FRANCIS V. ANDERSON. [L. S.]

Witnesses:
 JEROME J. FOLEY,
 GILBERT E. BRACH.